T. E. MURRAY.
VEHICLE WHEEL.
APPLICATION FILED MAY 28, 1915.
1,212,798.
Patented Jan. 16, 1917.
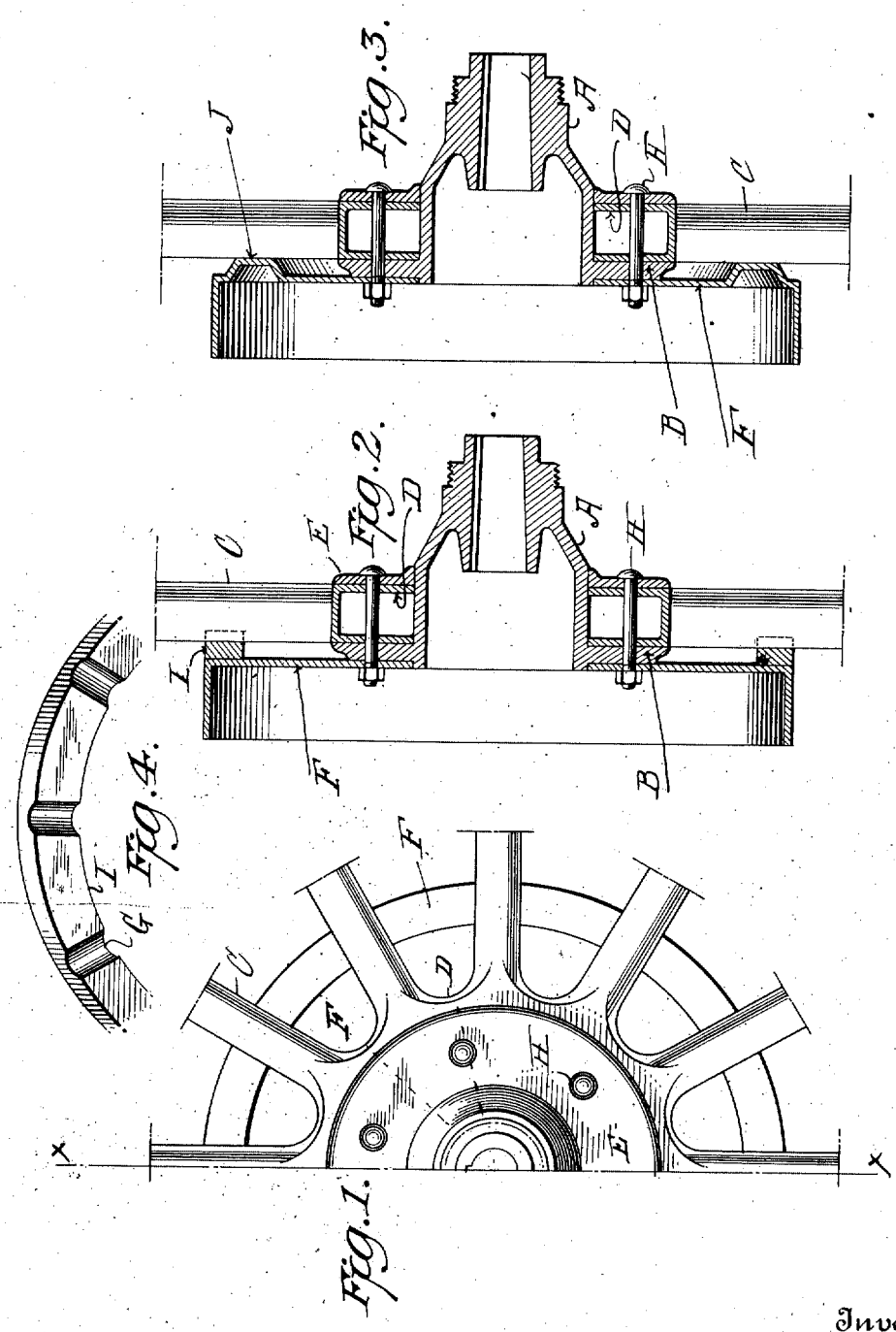
Inventor
Thomas E. Murray
By his Attorney

UNITED STATES PATENT OFFICE.

THOMAS E. MURRAY, OF NEW YORK, N. Y.

VEHICLE-WHEEL.

1,212,798.  Specification of Letters Patent.   Patented Jan. 16, 1917.

Application filed May 28, 1915. Serial No. 30,936.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to a vehicle wheel of metal, and to the combination with such a wheel of a brake disk.

The object of the invention is to strengthen the wheel, and it consists in the construction whereby each spoke is separately united to the brake disk near the outer periphery or flange thereof. In this way, the spokes are separately supported on the disk and at a distance from the hub, so that the disk acts as a girder or brace to unite the spokes and to distribute the strain among them.

In the accompanying drawings—Figure 1 is a face view of my wheel, the outer ends of the spokes and the felly being omitted. Fig. 2 is a section on the line $x, x$ of Fig. 1. Fig. 3 is a similar section, showing a modification in which the rib on the brake disk is made integral therewith. Fig. 4 is a portion of the grooved ring I.

Similar letters of reference indicate like parts.

A is the hub, having a circumferential flange B. The spokes C are tubular and may radiate from a ring D, which is received upon said hub and bears against the flange B. Instead of making the spokes integral with a complete ring D, I may divide said ring radially into sections, as indicated by dotted lines in Fig. 1, each spoke then being integral with one of said sections. Outside of ring D or the sections thereof disposed in juxtaposition, I place a washer E. On the hub on the opposite side of flange B is placed a brake disk F. Bolts H extend through the washer E, ring D or the sections thereof, flange B, and brake disk F, and secure said parts together.

I unite the spokes C separately to the brake disk F by means of a ring I, Figs. 2 and 4, having one side flat and welded to the disk, and provided with grooves G on the opposite side, into which grooves, the spokes C fit and are secured in place by welding. Instead of using a separate ring I, I may form an annular rib J integrally with and upon disk F, and provide grooves therein, as described.

I claim:

1. A vehicle wheel of metal having a wheel body, comprising a hollow nave and tubular spokes thereon, a brake disk, and a circular rib upon and concentric with said disk; the said spokes being each homogeneously united to said rib.

2. A vehicle wheel of metal having a wheel body, comprising a hollow nave and tubular spokes thereon, a brake disk, a circular rib upon and concentric with said disk, the said spokes being each homegeneously united to said rib, a hub, a flange on said hub interposed between said disk and said nave, and means for securing together said nave, hub flange and disk.

3. A vehicle wheel of metal, having a hub, spokes, a brake disk, and an annular rib struck up from the outer face of said disk near the circumferential periphery thereof: the said spokes being each homogeneously united to said rib.

In testimony whereof I have affixed my signature in presence of two witnesses.

THOMAS E. MURRAY.

Witnesses:
 GERTRUDE T. PORTER,
 MAY T. MCGARRY.